United States Patent
Pflug et al.

(10) Patent No.: US 9,695,765 B2
(45) Date of Patent: Jul. 4, 2017

(54) VAPOR RETURN SYSTEM OF A FUEL VAPOR COLLECTING TANK

(71) Applicant: GM GLOBAL TECHNOLOGY OPERATIONS LLC, Detroit, MI (US)

(72) Inventors: Arno Pflug, Mainz (DE); Joeran Zeiss, Griesheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 126 days.

(21) Appl. No.: 14/836,027

(22) Filed: Aug. 26, 2015

(65) Prior Publication Data

US 2016/0061124 A1 Mar. 3, 2016

(30) Foreign Application Priority Data

Aug. 26, 2014 (DE) .................. 10 2014 012 427

(51) Int. Cl.
*F02M 25/08* (2006.01)
*F02D 41/00* (2006.01)
*F02B 37/16* (2006.01)

(52) U.S. Cl.
CPC ............ *F02D 41/004* (2013.01); *F02B 37/16* (2013.01); *F02M 25/089* (2013.01); *F02M 25/0836* (2013.01); *F02D 2200/0406* (2013.01); *Y02T 10/144* (2013.01)

(58) Field of Classification Search
CPC ........ F02D 21/26; F02D 41/00; F02D 41/004; F02D 2200/0406; F02M 25/08; F02M 25/089; F02M 25/0836; F02M 25/0854; Y02T 10/144
See application file for complete search history.

(56) References Cited

U.S. PATENT DOCUMENTS

| 7,400,955 B2 | 7/2008 | Baumann et al. |
| 7,845,337 B2 * | 12/2010 | Song .................. F02M 25/0836 123/519 |
| 2013/0233287 A1 | 9/2013 | Leone |

FOREIGN PATENT DOCUMENTS

| DE | 102011086938 A1 | 5/2013 |
| DE | 102012207943 A1 | 11/2013 |
| EP | 1155896 A2 | 11/2001 |

OTHER PUBLICATIONS

German Patent Office, German Search Report for German Application No. 102014012427.4, dated Dec. 3, 2014.

* cited by examiner

*Primary Examiner* — Hieu T Vo
(74) *Attorney, Agent, or Firm* — Lorenz & Kopf LLP

(57) ABSTRACT

A vapor return system of a fuel vapor collecting tank includes a vapor outlet line with a first stop valve, which is arranged in the vapor outlet line of the fuel vapor collecting tank. A first vapor return branch is arranged between the vapor outlet line of the fuel vapor collecting tank and a charge air duct of a compressor in a turbocharger. A second vapor return branch is arranged between the vapor outlet line of the fuel vapor collecting tank and a fresh air suction duct of the compressor of the turbocharger. The first vapor return branch is connected by a first check valve to the charge air duct. The second vapor return branch is connected by a second check valve to a suction inlet of a venturi nozzle situated in a bypass line between the charge air duct and fresh air suction duct via a second stop valve.

12 Claims, 2 Drawing Sheets

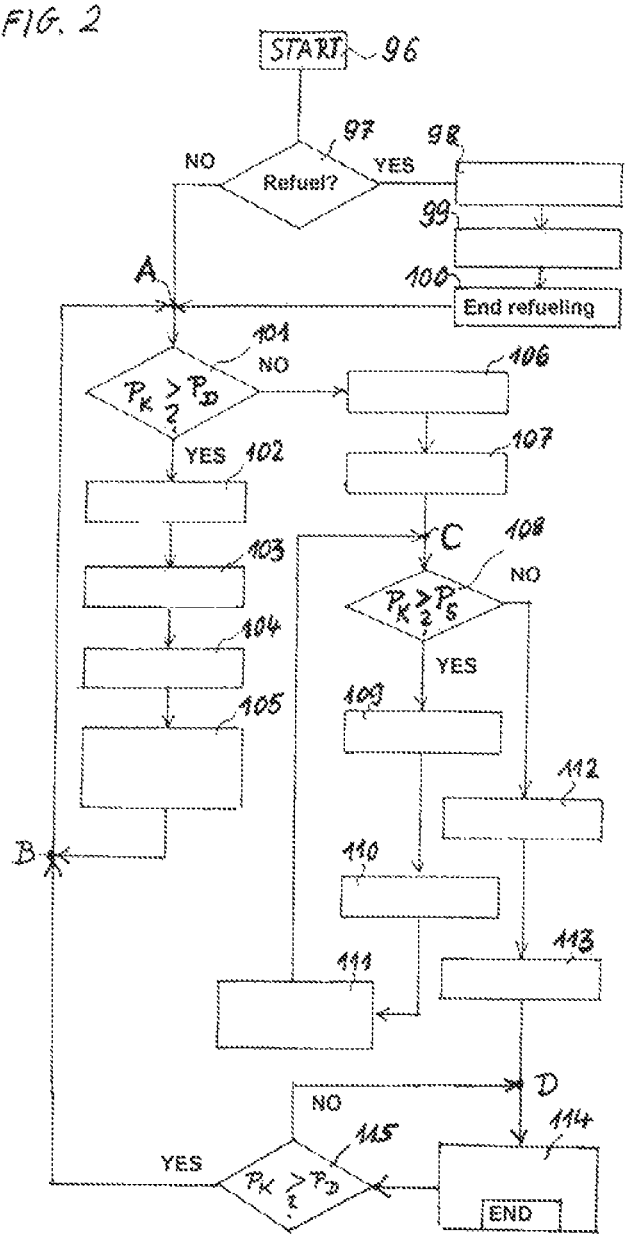

VAPOR RETURN SYSTEM OF A FUEL VAPOR COLLECTING TANK

CROSS-REFERENCE TO RELATED APPLICATION

This application claims priority to German Patent Application No. 102014012427.4, filed Aug. 26, 2014, which is incorporated herein by reference in its entirety.

TECHNICAL FIELD

The present disclosure relates to a vapor return system with a fuel vapor collecting tank for a vehicle.

BACKGROUND

US 2013/0233287 A1 discloses a vapor return system with a fuel vapor collecting tank in which a vapor outlet line can be fitted onto a suction inlet of a venturi nozzle by way of a stop valve. The venturi nozzle is either integrated into the charge air duct or situated in a bypass line, which circumvents a throttle flap in the charge air duct, and thus requires an additional parallel throttle flap in the bypass fine. The charge air pressure is diminished over the entire fuel vapor collecting tank evacuation period via the bypass flow for the venturi nozzle by bridging the throttle flap in the charge air duct.

SUMMARY

A vapor return system is disclosed which makes it possible to return the fuel vapor from the fuel vapor collecting tank to a combustion process of an internal combustion engine cost-effectively and with few valve assemblies. An embodiment includes a vapor return system with a fuel vapor collecting tank having a vapor outlet line with a first stop valve. A first vapor return branch is arranged between the vapor outlet line of the fuel vapor collecting tank and a charge air duct of a turbocharger compressor. A second vapor return branch is arranged between the vapor outlet line of the fuel vapor collecting tank and a fresh air suction duct of the turbocharger compressor. The first vapor return branch is connected by a first cheek valve to the charge air duct, and the second vapor return branch is connected by a second check valve to a venturi nozzle suction inlet, which is situated in a bypass line between the charge air duct and fresh air suction duct via a second stop valve.

One advantage to this embodiment is that the vapor return system has a two-stage structure, and therefore exhibits two vapor return branches. While the first vapor return branch introduces the fuel vapor directly into the charge air duct of the internal combustion engine via a check valve. Thus, the first branch conveys a significant portion of the fuel vapor enriched in the fuel vapor collecting tank into the internal combustion engine. The second vapor return branch initiates the evacuation of fuel vapor from the fuel vapor collecting tank via extraction with a venturi nozzle. To this end, the second vapor return branch includes a second stop valve, such that a venturi nozzle bridging the compressor need only be connected for a reduced period of time. The loss of charge air required for the bypass operation of the venturi nozzle is thus advantageously kept within a time limit, and can additionally be further diminished by the design of the venturi nozzle.

In a further embodiment, the first vapor return branch is connected with the charge air duct downstream from a throttle flap, for example by means of a T-connector. The advantage to positioning it downstream from the throttle flap on the one hand is that the fuel vapor is introduced directly into the air intake manifold, and on the other hand that the charge pressure is markedly lower downstream from the throttle flap than the charge pressure upstream from the throttle flap, since the charge air accumulates upstream from the throttle flap.

It is further provided that the first and second stop valves are connected with an engine control module (ECM) by way of control lines. The advantage to this is that the stop valves can be reliably actuated as a function of the operating conditions for the internal combustion engine. The engine control module here controls a plurality of routines necessary for the operation of an internal combustion engine. Such functional units are referred to as modules, in particular so as to emphasize their independence in terms of implementation. Modules can include hardware circuits having one or more processors with a memory, maximum integration circuits (VLSI), gate arrays, programmable logic and/or discrete components. The hardware circuits can perform logic functions, implement computer-readable programs stored on physical memory devices, and/or carry out programmed routines. Modules can further also include a computer-readable storage medium, which includes a computer-readable program stored on a physical memory device that performs a function when executed by a hardware circuit, such as a processor, microprocessor or the like.

In order to implement the vapor return process using the vapor return system and control it with the engine control module, the vapor return system in a further embodiment exhibits a first pressure sensor on the vapor outlet line of the fuel vapor collecting tank, a second pressure sensor on the venturi nozzle suction inlet, and a third pressure sensor downstream from the throttle flap of the charge air duct. At least these pressure sensors provide the engine control system with pressure values via corresponding signal lines, and the engine control system controls the first and second stop valve as a function of the measured pressure values.

An embodiment relates to an internal combustion engine system having a vapor return system of the kind described above. Another embodiment relates to a method for returning a fuel vapor from a fuel vapor collecting tank to a combustion process in which the pressure of fuel vapor in the fuel vapor collecting tank is determined. In addition, the pressure in a charge air duct downstream from a turbocharger compressor outlet and the pressure at a suction duct of a venturi nozzle is monitored with a first stop valve closed in a vapor outlet line of the fuel vapor collecting tank. If the fuel vapor pressure exceeds the pressure in the charge air duct, the first stop valve is opened, and a first return of fuel vapor from the fuel vapor collecting tank takes place in a first vapor return branch while opening a check valve. A second stop valve of a second vapor return branch is here kept closed. When the fuel vapor pressure has dropped below the pressure in the charge air duct, the second stop valve is opened, so that the second vapor return branch diverts the fuel vapor of the fuel vapor collecting tank into a fresh air suction duct by way of a second check valve and a venturi nozzle suction inlet until such time as the pressure in the fuel vapor collecting tank drops below the pressure in the venturi nozzle suction inlet. The first and second stop valves are then closed, which for the time being ends the process for returning a fuel vapor from a fuel vapor collecting tank, and the fuel vapor collecting tank can be charged with fuel vapor once again.

An advantage of this method is that the venturi nozzle operated via a bypass and with the compressor bridged is limited in the time for which it is used to remove residual gas content from the fuel vapor collecting tank until the fuel vapor has been practically completely evacuated from the fuel vapor collecting tank. As a consequence, the phase in which the air is removed from the charge air duct via the bypass line, and hence the charge air pressure in the charge air duct is diminished, is extremely small. This is enabled by the fact that the method for returning a fuel vapor from the fuel vapor collecting tank is implemented in two phases. A further advantage lies in the fact that this method can be implemented with the present engine control module if the required lines of the fuel return system are integrated into the fuel supply of the internal combustion engine.

It is further provided that the fuel vapor collecting tank continue to be charged with fuel vapor until the fuel vapor pressure in the fuel vapor collecting tank exceeds the pressure in the charge air duct, which can be repeated, for example until the internal combustion engine system is turned off. However, the method for returning the fuel vapor in the combustion process can also be interrupted at any time for other routines that may arise during engine operation.

In order to interrupt the fuel returning process as well as turn off the internal combustion engine, the first and second stop valves of the vapor return system are simultaneously closed, thus providing another embodiment of the present disclosure.

A computer program product, which when implemented on a computing unit (ECM) of an internal combustion engine, instructs the computing unit (ECM) to execute the foregoing method. Additionally provided is a computer-readable medium that stores such a computer program product. More particularly, the pressure in the fuel vapor collecting tank, the pressure in a charge air duct downstream from a turbocharger compressor outlet, as well as the pressure at a venturi nozzle suction inlet are first determined with the first stop valve closed in a vapor outlet line of the fuel vapor collecting tank. The first stop valve then opens when the fuel vapor pressure exceeds the pressure in the charge air duct, while a check valve in a first vapor return branch is automatically opened, and a second stop valve of a second vapor return branch is kept closed. If the fuel vapor pressure drops below the pressure in the charge air duct, a second stop valve is opened, so that the second vapor return branch now diverts the fuel vapor of the fuel vapor collecting tank into a fresh air suction duct by way of a second check valve and venturi nozzle suction inlet until such time that the pressure in the fuel vapor collecting tank drops below the pressure at the venturi nozzle suction inlet. The first and second stop valves are then closed. The fuel vapor collecting tank can be charged with fuel vapor once again.

BRIEF DESCRIPTION OF THE DRAWINGS

The present disclosure will hereinafter be described in conjunction with the following drawing figures, wherein like numerals denote like elements.

FIG. 2 diagrammatically shows a flowchart for a method of returning the fuel vapor from a fuel vapor collecting tank to the internal combustion engine system.

DETAILED DESCRIPTION

Figure 1:
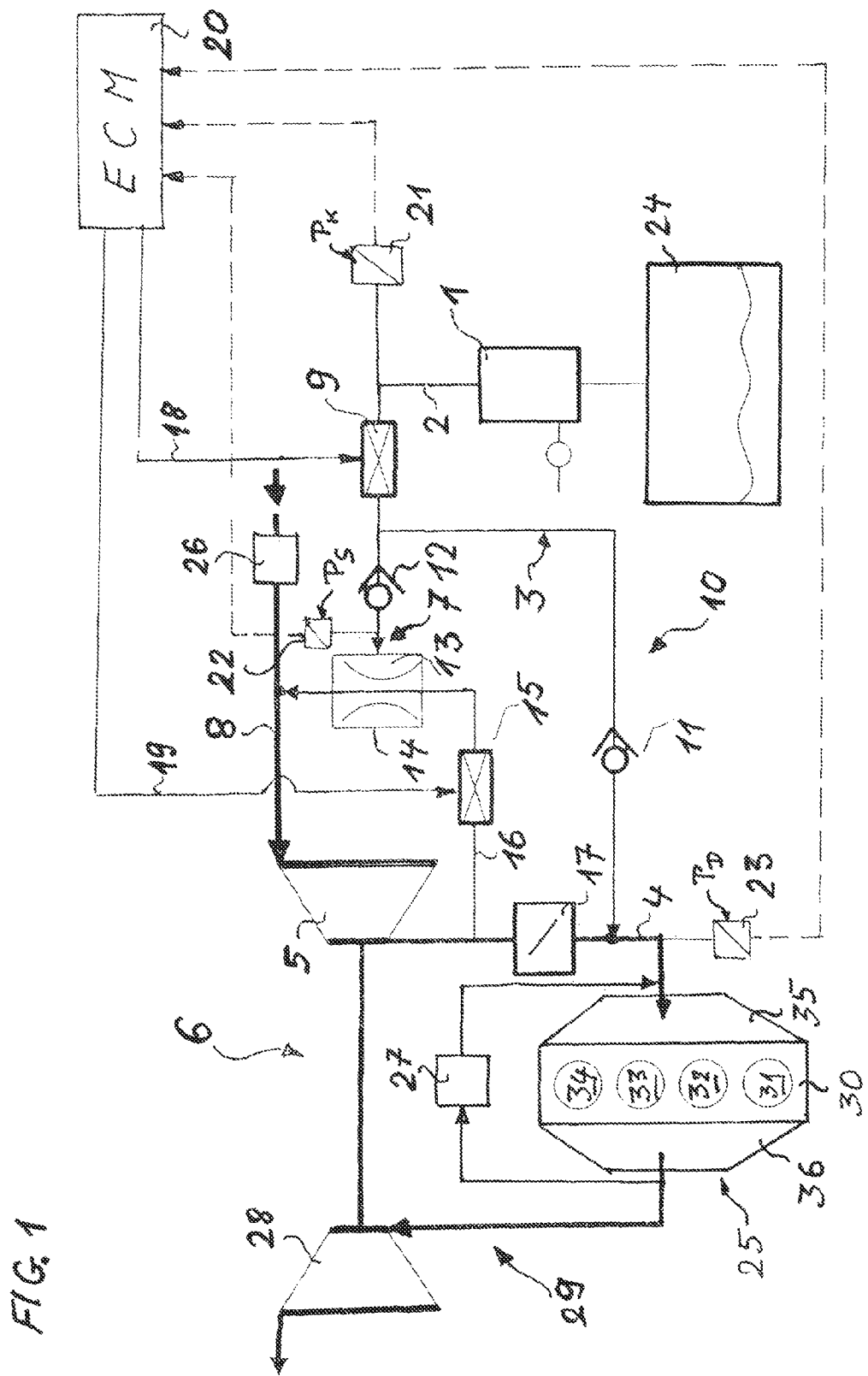
FIG. 1 shows a diagrammatic view of an internal combustion engine system with a vapor return system of a fuel vapor collecting tank according to one embodiment.

The following detailed description is merely exemplary in nature and is not intended to limit the invention or the application and uses of the invention disclosed herein. Furthermore, there is no intention to be bound by any theory presented in the preceding background of the present disclosure or the following detailed description.

FIG. 1 shows a diagrammatic view of an internal combustion engine system 25 with a vapor return system 10 of a fuel vapor collecting tank 1 according to one embodiment. The internal combustion engine system 25 includes an engine 30, an exhaust system 29 as well as the vapor return system 10. The internal combustion system 25 draws air through an air filter 26 and turbocharger 6. During operation, air enters into the engine 30 after passing through the air fitter 26. Fresh air passing through the air filter 26 can be drawn into a compressor 5 of the turbocharger 6. The air is compressed by the compressor 5, which can increase the output of the engine 30. The compressed air is drawn into an air intake manifold 35 of the engine 30. The air intake manifold 35 distributes the air in the cylinders 31-34 of the engine 30. The engine 30 further includes fuel injectors (not shown) and an exhaust manifold 36. The fuel is injected from the tank 24 into the cylinders 31-34 via fuel injectors (not shown). The injected fuel mixes with the air to yield an air/fuel mixture in the cylinders 31-34. The air/fuel mixture is compressed by the cylinders 31-34. The compressed air/fuel mixture is either ignited and burned, or burned through spontaneous ignition. Burning the air/fuel mixture in this way generates exhaust gas. The exhaust gas exits the cylinders 31-34 into the exhaust system 29. While engine 30 is shown having four cylinders 31-34, the embodiment disclosed here applies to internal combustion engine systems with any desired number of cylinders and accompanying fuel injectors along with the ignition devices.

The internal combustion engine system 25 may include an exhaust gas return (EGR) valve 27 so as to return a portion of the exhaust as to the intake manifold 35. During operation, the remaining exhaust gas flows out of the internal combustion engine system 25, and from the exhaust manifold 36 into the turbocharger 6, so as to drive a turbine 28. The turbine 28 supports the compression of air taken in by the air filter 26. The exhaust gas flows from the turbocharger 6 through different catalytic converters (not shown), and is exhausted from the vehicle through a muffler (not shown).

The internal combustion engine system 25 is supported by an engine control module 20 (ECM), which controls a wide variety of operating routines for the different engine assemblies, and interacts with at least three sensors 21, 22 and 23 of the vapor return system 110 to return fuel vapor from the filet vapor collecting tank 1, so as to reliably control first and second stop valves 9, 15 via the control lines 18, 19 respectively. The pressure sensors 21, 22 and 23 are for their part connected with the engine control module 20 by signal lines 37, 38 and 39 respectively.

The vapor return system 10 includes a first vapor return branch 3 and a second vapor return branch 7. Both vapor return branches 3, 7 are connected with the fuel vapor collecting tank 1 by a shared first stop valve 9 and a vapor outlet line 2.

The first vapor return branch 3 is connected by means of a first check valve 11 with a charge air duct 4 downstream from the compressor 5 of the turbocharger 6 and downstream from a throttle flap 17 between the outlet of the first stop valve 9. As a result, the first vapor return branch 3 is automatically activated as soon as the first stop valve 9 is switched to "open", when the fuel pressure $P_K$ in the fuel vapor collecting tank 1 exceeds a pressure $P_D$ in the charge air duct 4 of the internal combustion engine system 25.

The second vapor return branch 7 is arranged between the outlet of the first stop valve 9 and a fresh air suction duct 8 downstream from the air filter 26, and exhibits a second check valve 12 along with a venturi nozzle 14 that has a suction inlet 13 through which residual vapor is drawn out of the fuel vapor collecting tank 1 and supplied to the fresh air suction duct 8. However, this second vapor return branch 7 only comes into operation when the engine control module 20 opens the second stop valve 15 via the control line 19, so that a bypass line 16 between the compressor outlet and fresh air suction duct 8 can supply the venturi valve 14. As a consequence, the second vapor return branch 7 comes into operation only when the first throttle valve 11 blocks the first vapor return branch 3. As long as the first vapor return branch 3 is operational, the venturi nozzle 14 remains deactivated by the stop valve 15 to stop the loss of charge air in the charge air duct 4 caused by the bypass line 16, and thereby improve the energy efficiency of the internal combustion engine system 25 with vapor return system 10.

FIG. 2 diagrammatically shows a flowchart for a method of returning the fuel vapor from a fuel vapor collecting tank to the internal combustion engine system. The method can be initiated with step 96 as the starting step, and in a decision step involves initially checking whether a routine with a higher priority would have to be performed. The steps following the initiation step 96 are marked 97 to 115. At the same time, the flowchart makes reference to individual components, which are depicted on FIG. 1 and are labeled with reference numbers less than 50.

After procedural step 96 has begun, a query in step 97 is carried out to determine whether refueling is to be performed as a routine process at a higher priority than the vapor return process, for example. If this is the case, the fuel vapor return process in step 98 must be shut down by closing the first stop valve, and fueling must take place in step 99 until fueling has ended in step 100.

This can be followed by another decision step 101, which involves checking whether the pressure $P_K$ in the fuel vapor collecting tank 1 is greater than the pressure $P_D$ in a charge air duct 4. If this is the case, step 102 is initiated to open the first stop valve 9, which connects both the first vapor return branch 3 and second vapor return branch 7 with the fuel vapor collecting tank 1 via a vapor outlet line 2 of the fuel vapor collecting tank 1. As soon as the first stop valve 9 is opened, the first check valve 11 arranged in the first vapor return branch 3 automatically opens in step 103. At the same time, the second stop valve 15 remains closed in step 104, so that the second vapor return branch 7, and hence the venturi nozzle 14 in this second vapor return branch 7, cannot come into operation. The fuel vapor is initially evacuated in step 105 exclusively via the first vapor return branch 1, wherein the fuel vapor is guided in the charge air duct 4 depicted on FIG. 1 downstream from the throttle flap 17.

The fuel vapor can be evacuated until such time as the pressure $P_K$ in the fuel vapor collecting tank 1 drops below the pressure $P_D$ prevailing in the charge air duct 4 and the process sequence returns to point A and procedural step 106 follows, during which the first check valve 11 closes owing to the evacuation of vapor from the fuel vapor collecting tank 1, and the second stop valve 12 is now opened in step 107. A decision is made in another decision route 108 as to whether the remaining vapor pressure $P_K$ in the fuel vapor collecting tank 1 is greater than a suction pressure $P_S$ now being applied to the suction inlet 13 of the venturi nozzle 14 as the result of opening the second stop valve 15. If this is the case, the second check valve 12 will open in step 109, so that vapor can be discharged via the second vapor return branch 7 in step 110. In step 111, the fuel vapor collecting tank is further evacuated, and the respective pressure drop is checked by looping back to point C. As soon as the fuel vapor pressure $P_K$ in the fuel vapor collecting tank 1 is less than the suction pressure $P_S$, the second check valve 12 closes automatically in procedural step 112. The first stop valve 7 is thereupon also closed again in step 113 by the engine control module 20 via a control line 18. The fuel vapor collecting tank 1 can now accumulate and hold fuel once again in step 114, thus ending a first routine.

However, the rise in fuel vapor pressure $P_K$ in the fuel vapor collecting tank 1 is automatically and simultaneously continuously checked in decision step 115, so that the vapor return process shown here can again be continued in step 101. The first stop valve 9 makes it possible to interrupt the entire vapor return process at any time, as depicted on FIG. 2, and continue it from the step at which it was discontinued, or generally reset it to the beginning at step 101 or to the starting step 96.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vapor return system comprising:
   a fuel vapor collecting tank having a vapor outlet line;
   a first stop valve arranged in the vapor outlet line;
   a first vapor return branch between the vapor outlet line and a charge air duct of a compressor of a turbocharger;
   a second vapor return branch between the vapor outlet line and a fresh air suction duct of the compressor;
   wherein the first vapor return branch is connected by a first check valve to the charge air duct; and
   wherein the second vapor return branch is connected by a second check valve to a suction inlet of a Venturi nozzle situated in a bypass line between the charge air duct and fresh air suction duct via a second stop valve.

2. The vapor return system according to claim 1, further comprising a throttle flap arranged in the charge air duct, and wherein the first vapor return branch is connected with the charge air duct downstream from the throttle flap.

3. The vapor return system according to claim 1, further comprising an engine control module operably coupled to the first and second stop valves by way of control lines.

4. The vapor return system according to claim 1, further comprising a first pressure sensor arranged in the vapor outlet line to measure a fuel vapor pressure in the fuel vapor collecting tank.

5. The vapor return system according to claim 4, further comprising a second pressure sensor arranged in the first vapor return branch to measure a fuel vapor pressure in the charge air duct.

6. The vapor return system according to claim 5, further comprising a third pressure sensor arranged in the second vapor return branch when the first stop valve is closed.

7. An internal combustion engine system comprising a vapor return system according to claim 1.

8. A computer program product which, when implemented on an electronic control module of an internal combustion engine system, instructs the electronic control module to execute the following process:
   a) receive a first signal from a first sensor indicating a fuel vapor tank pressure in the fuel vapor collecting tank;
   b) receive a second signal from a second sensor indicating a fuel vapor duct pressure in a charge air duct downstream from an outlet of a compressor of a turbocharger;
   c) receive a third signal from a third sensor indicating a fuel vapor inlet pressure at a suction inlet of a Venturi nozzle when a first stop valve in a vapor outlet line of the fuel vapor collecting tank is closed;
   d) open the first stop valve when the fuel vapor tank pressure exceeds the fuel vapor duct pressure, while a check valve in a first vapor return branch is automatically opened, and a second stop valve of a second vapor return branch is closed;
   e) open the second stop valve when the fuel vapor tank pressure drops below the fuel vapor inlet pressure such that the second vapor return branch diverts the fuel vapor of the fuel vapor collecting tank into a fresh air suction duct by way of a second check valve and a suction inlet of a Venturi nozzle until such time that the fuel vapor tank pressure drops below the fuel vapor inlet pressure; and
   f) close the first and second stop valves.

9. A non-transitory computer-readable medium, on which a computer program product according to claim 8 is stored.

10. A method for returning a fuel vapor to combustion process in a vapor return system comprising:
   a) determining a fuel vapor tank pressure in the fuel vapor collecting tank;
   b) determining a fuel vapor duct pressure in a charge air duct downstream from an outlet of a compressor of a turbocharger;
   c) determining a fuel vapor inlet pressure at a suction inlet of a Venturi nozzle when a first stop valve in a vapor outlet line of the fuel vapor collecting tank is closed;
   d) opening the first stop valve when the fuel vapor tank pressure exceeds the fuel vapor duct pressure in the charge air duct, while a check valve in a first vapor return branch is automatically opened, and a second stop valve of a second vapor return branch is closed;
   e) opening the second stop valve when the fuel vapor pressure drops below the pressure in the charge air duct such that the second vapor return branch diverts the fuel vapor of the fuel vapor collecting tank into a fresh air suction duct by way of a second check valve and a suction inlet of a Venturi nozzle until such time that the fuel vapor tank pressure drops below the fuel vapor inlet pressure; and
   f) closing the first and second stop valves.

11. The method according to claim 10, further comprising charging the fuel vapor collecting tank with fuel vapor until the fuel vapor tank pressure exceeds the fuel vapor inlet pressure, and repeating d) through f) until the internal combustion engine system is turned off.

12. The method according to claim 11, further comprising simultaneously closing the first and second stop valves of the vapor return system when the internal combustion engine system is turned off.

* * * * *